(12) United States Patent
Schnetker

(10) Patent No.: US 7,350,281 B2
(45) Date of Patent: Apr. 1, 2008

(54) METHOD OF PROTECTING A CAPACITOR

(75) Inventor: Ted R. Schnetker, Rockford, IL (US)

(73) Assignee: Hamilton Sundstrand Corporation, Rockford, IL (US)

( * ) Notice: Subject to any disclaimer, the term of this patent is extended or adjusted under 35 U.S.C. 154(b) by 82 days.

(21) Appl. No.: 10/899,255

(22) Filed: Jul. 26, 2004

(65) Prior Publication Data

US 2006/0018080 A1 Jan. 26, 2006

(51) Int. Cl.
*H01G 7/00* (2006.01)
(52) U.S. Cl. .............. 29/25.41; 29/592.1; 29/832; 29/841; 29/854; 361/301.3; 361/306.1; 361/311; 361/323; 361/571; 427/79; 427/80
(58) Field of Classification Search ..... 361/301–301.5, 361/306–306.3, 311, 323, 517–521, 535–539, 361/571–521; 29/25.03, 25.42, 592.1, 832, 29/841, 854, 855; 427/79, 80
See application file for complete search history.

(56) References Cited

U.S. PATENT DOCUMENTS

| | | | |
|---|---|---|---|
| 3,585,468 A * | 6/1971 | Chertok et al. .............. 361/323 |
| 4,179,725 A * | 12/1979 | Maguire ..................... 361/540 |
| 4,266,332 A * | 5/1981 | Markarian et al. ......... 29/25.03 |
| 4,330,929 A * | 5/1982 | Cripe ........................ 29/25.03 |
| 4,499,524 A * | 2/1985 | Shioleno ..................... 361/772 |
| 4,794,491 A * | 12/1988 | Saiki .......................... 361/532 |
| 4,881,149 A * | 11/1989 | Tokura et al. .............. 361/328 |
| 5,018,048 A * | 5/1991 | Shaw et al. ................. 361/323 |
| 5,420,757 A | 5/1995 | Eberhardt et al. |
| 5,565,682 A * | 10/1996 | Frank et al. ............. 250/338.1 |
| 5,581,437 A * | 12/1996 | Sebillotte et al. .......... 361/323 |
| 5,716,420 A * | 2/1998 | Kuriyama ................. 29/25.03 |
| 5,844,770 A * | 12/1998 | Fries-Carr et al. ....... 361/301.5 |
| 6,185,091 B1 * | 2/2001 | Tanahashi et al. .......... 361/529 |
| 6,284,818 B1 | 9/2001 | Kawata et al. |

(Continued)

FOREIGN PATENT DOCUMENTS

JP 3-116710 * 5/1991

(Continued)

OTHER PUBLICATIONS

"New high temperature polymer thin coating for power electronics"; Kumar, R.; Molin, D.; Young, L.; Ke, F.; Applied Power Electronics Conference and Exposition, 2004. APEC '04. Nineteenth Annual IEEE vol. 2, 2004; pp. 1247-1249.*

*Primary Examiner*—Paul D. Kim
(74) *Attorney, Agent, or Firm*—Carlson, Gaskey & Olds

(57) ABSTRACT

An electric device includes an electric element, such as a wound film capacitor, with power input and output leads. The electric element includes a coating layer of parylene that provides moisture resistance and low gas and moisture permeability to protect the electric element from short and long term moisture degradation effects. A known case layer is located adjacent to the coating layer. The case layer is a metal, epoxy-based, silicone-based, or polymer material that encapsulates the coating layer and the electric element to protect the coating layer and electric element from physical damage.

10 Claims, 2 Drawing Sheets

U.S. PATENT DOCUMENTS

| | | |
|---|---|---|
| 6,334,879 B1 | 1/2002 | Muffoletto et al. |
| 6,584,853 B2 | 7/2003 | Park et al. |
| 6,627,509 B2 * | 9/2003 | Duva ......................... 438/400 |
| 6,683,782 B2 * | 1/2004 | Duva ......................... 361/311 |
| 2003/0099085 A1 * | 5/2003 | Duva ......................... 361/311 |

FOREIGN PATENT DOCUMENTS

| | | | |
|---|---|---|---|
| JP | 6-302478 | * | 10/1994 |
| JP | 8-45794 | * | 2/1996 |
| JP | 11214272 A | * | 8/1999 |

* cited by examiner

METHOD OF PROTECTING A CAPACITOR

BACKGROUND OF THE INVENTION

This invention relates to moisture sealing of electronic devices and, more particularly, to coating a capacitor element with a moisture resistant material layer.

Aircraft and other equipment utilize capacitors in avionics, power converters, electric/electronic motor controllers and other applications. Capacitors are used for electrical energy storage, waveform shaping, electromagnetic interference, lightning protection and other similar functions. Increased use of electronic devices in avionics and other applications, such as in electronic motor controllers in place of previously used hydraulic, pneumatic, or other power sources, increases the number and size of capacitors used in these applications.

Aircraft and other equipment that are exposed to ambient unprotected weather conditions and/or to high humidity environments in normal operation or storage require that exposure to moisture not affect the operation, life, maintenance cost, or reliability of associated electronic equipment.

Certain equipment that utilizes capacitors, as an example aircraft, perform their intended functions more successfully if size and weight are minimized. Many capacitive elements, such as those constructed of wound elements of metallized polymer film, will degrade and fail due to corrosion or other moisture-related processes if exposed to high levels of moisture or low levels of moisture for significant periods of time.

Conventional capacitors such as those used for aerospace, industrial, and automotive applications commonly utilize either a plastic or metal case which surrounds the actual capacitive element to provide moisture protection for applications where moisture protection is required. However, the plastic and metal cases used for this purpose may exhibit inadequate moisture protection and add significantly to the cost, size and weight of these conventional capacitors.

Complete electronic units such as a circuit board may be sealed against moisture by structural design or through the application of a coating to the entire electronic unit. These designs, coatings, and related processes, however, may interfere with cooling airflow, repair and maintenance activity, and other operational requirements. Additionally, the designs and coating may increase the cost, size, and/or weight of the electronic unit.

Accordingly, a compact, lightweight, and inexpensive capacitor that provides resistance to gas and moisture infiltration is needed.

SUMMARY OF THE INVENTION

The electric device according to the present invention provides an electric element, such as a wound film capacitor, with power input and output leads. The electric element includes a coating layer of poly-para-xylylene, generically known as parylene. The coating layer provides moisture resistance and low gas and moisture permeability to protect the electric element from short and long-term moisture degradation effects. The coating layer is between about 0.0003 inches and about 0.3 inches thick.

A known case layer is located adjacent to the coating layer. The case layer is a metal, epoxy-based, silicone-based, or polymer material that encapsulates the coating layer and the electric element to protect the coating layer and electric element from physical damage. Since the coating layer provides gas and moisture resistance, a thinner, lighter, less expensive or unsealed case layer may be utilized than would be used in prior art electric devices without a coating layer.

The electric device of the present invention therefore provides a compact, light weight, and inexpensive capacitor that resists moisture infiltration.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
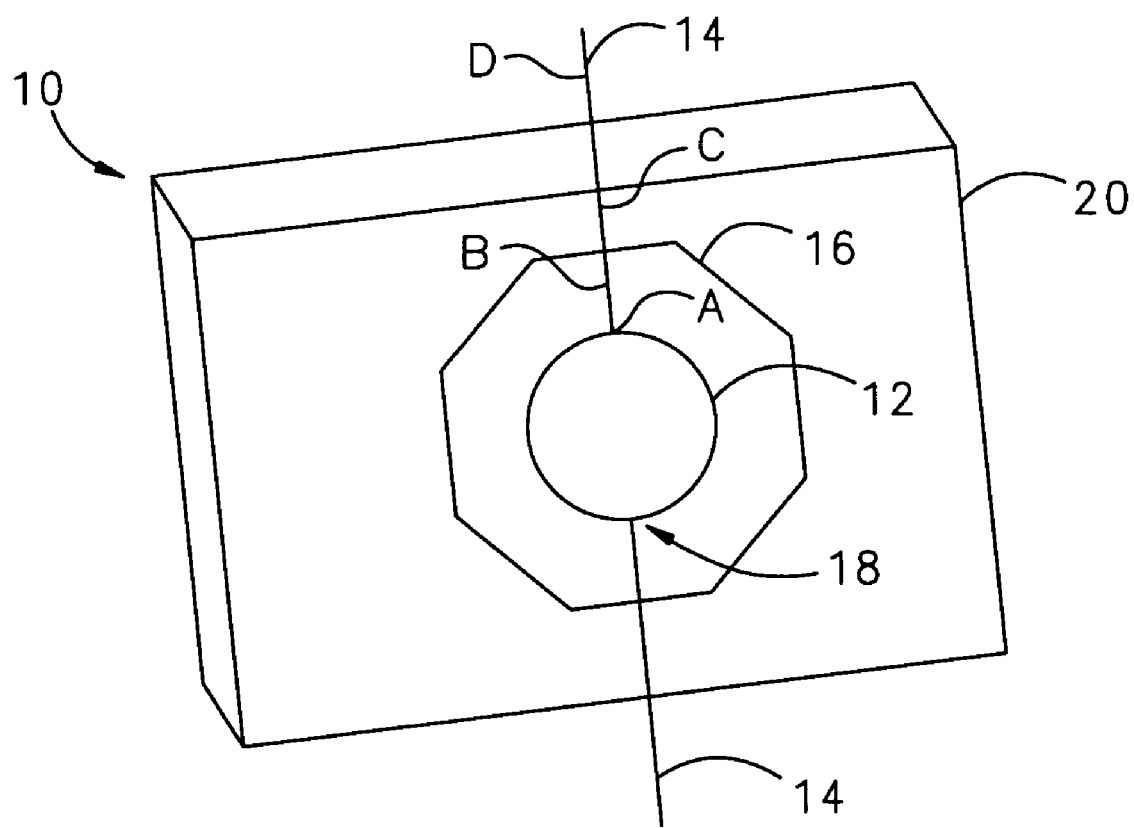
FIG. 1 illustrates a schematic cross-sectional view of an exemplary electric device of the present invention.

FIG. 1 illustrates a schematic cross-sectional view of an electric device 10. The electric device 10 includes an electric element 12, preferably a wound film capacitor, with electric leads 14 for power input and output. The electric leads each include a first portion A coupled to the electric element 12, a second portion B, third portion C, and fourth portion D that extends from the electric element 12. A coating layer 16 is deposited adjacent to the electric element 12.

The coating layer 16 is a polymer, preferably poly-para-xylylene. Poly-para-xylylene is also known generically as "Parylene" which is a polymer series developed by Union Carbide. The term "Parylene" describes vapor deposited poly-para-xylylene polymers without referring to any particular chemical formulas or manufacturers for any particular polymers of this chemical family. Parylene generally exhibits fine moisture resistance and low gas and moisture permeability and thus provides a protective barrier for the electric element 12 against gas and moisture. The coating layer 16 of parylene preferably encapsulates portion B of the electric element 12 to provide an essentially hermetic seal surrounding the electric element 12 such that minimal gas and moisture penetrates through the coating layer 16 of parylene.

A vapor deposition process or other known deposition process may be used to deposit the coating layer 16. A portion 18 of the electric element 12 or electric leads 14 may be masked during the deposition process to prevent deposition of the coating layer 16 on the portion 18 or electric leads 14. The electric leads 14 are attached to the portion 18 of the electric element 12 subsequent or prior to the deposition process. Preferably however, the electric leads 14 are attached to the electric element 12 prior to the deposition process for satisfactory gas and moisture sealing.

The coating layer 16 is between about 0.0003 inches and about 0.3 inches thick, however, a thickness between about 0.001 inches and about 0.004 inches is preferred. A larger thickness in the range generally allows less gas and moisture to penetrate relative to smaller thicknesses in the range. Increasing the thickness, however, increases the weight of the electric device 10.

The electric device 10 includes a known case layer 20 located adjacent to the coating layer 16. The case layer 20 is a metal or polymeric material, and preferably is an epoxy-based, silicone-based, thermoplastic, or other polymer material. The case layer 20 provides mechanical toughness and durability. In some examples, because the inventive coating layer 16 provides gas and moisture resistance, a thinner case layer 20 may be utilized than would be used conventionally. Moreover, if metal is utilized for the case layer 20, conventional gas and moisture-sealing features used to resist moisture incursion, such as hermetic seals for the case or capacitor leads, may be eliminated. Utilizing a thinner case layer 20 therefore reduces the size, weight and expense of the electric device 10. Moreover, the case thickness and moisture-sealing features may be reduced or eliminated.

The case layer 20 may be deposited or formed adjacent to the coating layer 16 in a potting process, as is known to those of ordinary skill in the art. Alternatively, the case layer may be formed adjacent to the coating layer 16 by dipping the coating layer 16 and the electric element in liquid polymer and then curing or hardening the liquid polymer. The case layer 20 preferably encapsulates the coating layer 16 and portion C of the electric element 12 to protect the coating layer 16 and electric element 12 from physical damage such as might occur during handling or operation.

Figure 2:
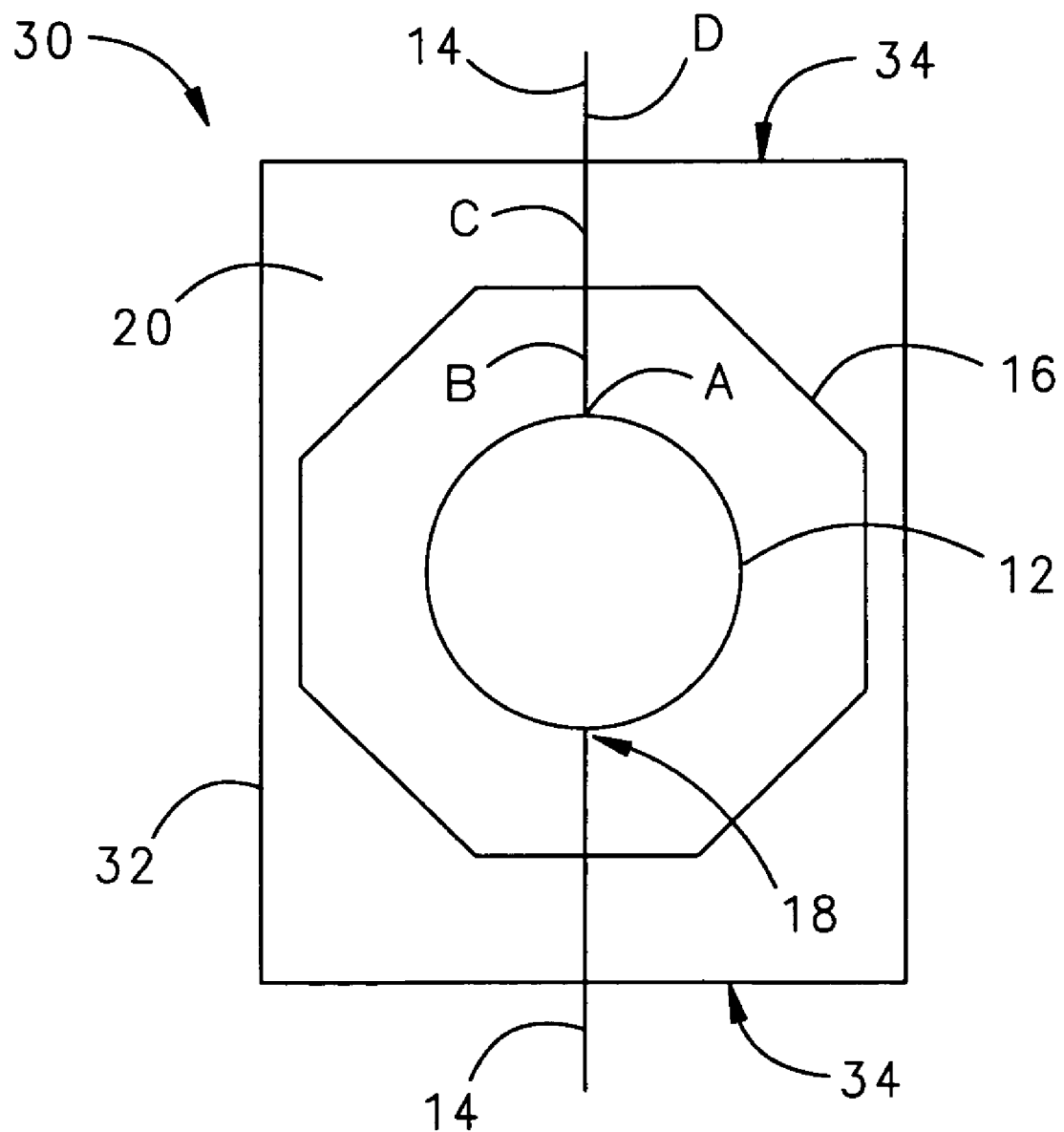
FIG. 2 illustrates a schematic cross-sectional view of another exemplary electric device of the present invention.

FIG. 2 illustrates a schematic cross-sectional view of another electric device 30. The electric device 30 includes a known tape 32 that is wound around the electric element 12 and coating layer 16. The electric leads 14 extend from the open ends 34 of the tape, which is preferably formed from a polymer. The case layer 20 is adjacent to the coating layer 16 and deposited inside the tape 32 in a known "tape and fill" process.

The electric device of the present invention therefore provides a compact, lightweight capacitor that resists gas and moisture infiltration. Furthermore, the electric device may eliminate expensive or heavy hermetic seal features and thick encapsulants.

Although a preferred embodiment of this invention has been disclosed, a worker of ordinary skill in this art would recognize that certain modifications would come within the scope of this invention. For that reason, the following claims should be studied to determine the true scope and content of this invention.

I claim:

1. A method of protecting a capacitor comprising the steps:
    (a) vapor depositing a poly-para-xylylene coating layer entirely on a wound film capacitor;
    (b) hermetically sealing a lead wire that extends from the wound film capacitor at least partially within the poly-para-xylylene coating layer;
    (c) depositing a case layer on the poly-para-xylylene coating layer; and
    (d) sealing the lead wire at least partially within the case layer.

2. The method as recited in claim 1, wherein said step (c) further comprises depositing the case layer of polymer on the poly-para-xylylene coating layer.

3. The method as recited in claim 1, wherein said step (c) further comprises depositing a case layer of metal on the poly-para-xylylene coating layer.

4. The method as recited in claim 1, further comprising the step of masking a portion of the wound film capacitor before depositing the poly-para-xylylene coating layer.

5. The method as recited in claim 1, further comprising the step wrapping the wound film capacitor and the poly-para-xylylene coating layer with a tape before said step (c).

6. The method as recited in claim 1, wherein said step (b) includes embedding the lead wire at least partially within the poly-para-xylylene coating layer.

7. The method as recited in claim 1, wherein said step (d) includes embedding the lead wire at least partially within the case layer.

8. The method as recited in claim 1, wherein said step (c) includes depositing the case layer such that the case layer and the coating layer are in direct contact entirely about the wound film capacitor except at the lead wire.

9. The method as recited in claim 1, wherein said step (a) includes depositing the poly-para-xylylene coating layer entirely about the wound film capacitor except at the lead wire.

10. The method as recited in claim 1, wherein said step (b) includes completely hermetically sealing the wound film capacitor with the poly-para-xylylene coating layer.

* * * * *